United States Patent [19]  [11] Patent Number: 4,854,639
Burleigh et al.  [45] Date of Patent: Aug. 8, 1989

[54] CHILD'S SAFETY SEAT

[75] Inventors: David W. Burleigh; Andrew J. Assinder, both of Bognor Regis, West Sussex, England

[73] Assignee: Britax-Excelsior Limited, England

[21] Appl. No.: 300,958

[22] Filed: Jan. 23, 1989

[30] Foreign Application Priority Data

Jan. 26, 1988 [GB] United Kingdom ............... 8801716

[51] Int. Cl.$^4$ ............................................. A47C 1/08
[52] U.S. Cl. .................................... 297/250; 297/216; 297/410
[58] Field of Search ............... 297/250, 216, 464, 410, 297/468

[56] References Cited

U.S. PATENT DOCUMENTS

| 3,794,379 | 2/1974 | Furey | 297/250 |
| 4,285,545 | 8/1981 | Protze | 297/410 |
| 4,402,548 | 9/1983 | Mason | 297/250 |
| 4,688,849 | 8/1987 | Tsuge et al. | 297/250 |

Primary Examiner—James T. McCall
Attorney, Agent, or Firm—Davis, Bujold & Streck

[57] ABSTRACT

A child's safety seat comprises a seat body having a seat portion, a back rest and vertically extending side walls projecting forwardly from the side edges of the back rest. First and second guide means adjacent to the junction between the seat portion and the back rest for serve to locate a lap portion of an adult seat belt. A head rest is mounted on the back rest by means permitting adjustment of the distance between the head rest and the seat portion. Third guide means is positioned so as to guide a shoulder portion of an adult belt between the back rest and the head rest.

9 Claims, 5 Drawing Sheets

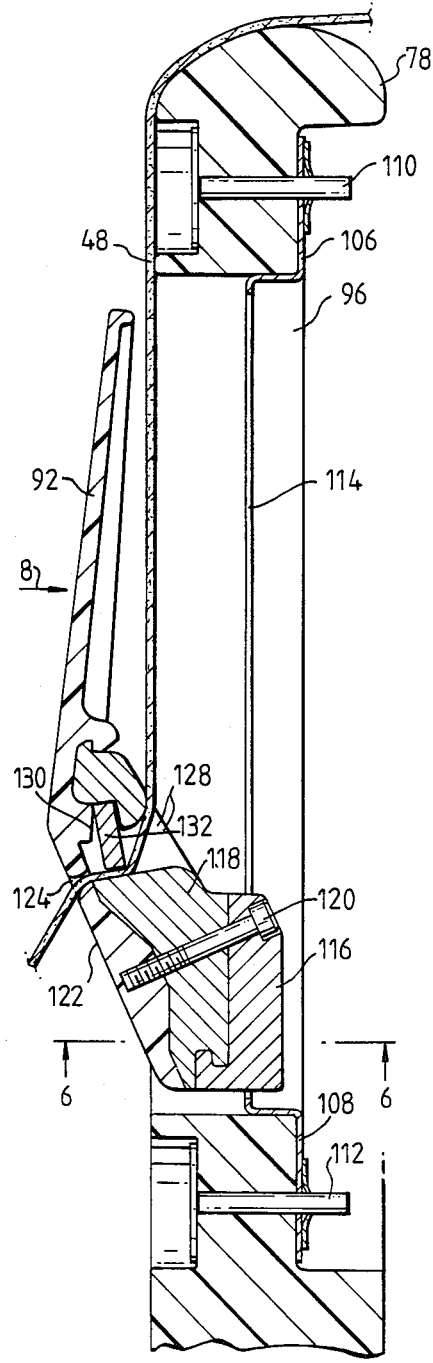
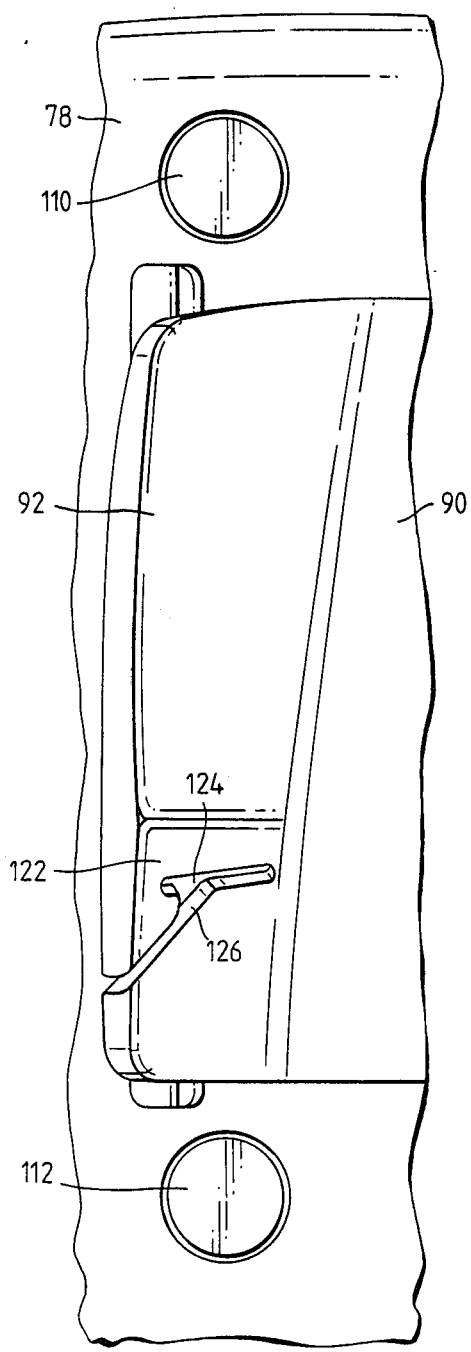
Fig. 7.
Fig. 8.

CHILD'S SAFETY SEAT

This invention relates to a child's safety seat of the type comprising a seat body having a seat portion, a back rest and vertically extending side walls projecting forwardly from the side edges of the back rest, together with first and second guide means adjacent to the junction between the seat portion and the back rest for locating a lap portion of an adult seat belt, and third guide means on the back rest for locating a shoulder portion of an adult seat belt.

According to the invention, in a child's safety seat of this type, a head rest is mounted on the back rest by means permitting adjustment of the distance between the head rest and the seat portion, and the third guide means is positioned so as to guide said shoulder portion of an adult belt between the back rest and the head rest.

Embodiments of the invention will now be described, by way of example with reference to the accompanying drawings, in which:

FIG. 7 is a cross-sectional view taken on the line 7—7 in FIG. 6; and

FIG. 8 is a scrap view in the direction of the arrow 8 in FIG. 7.

Figure 1:
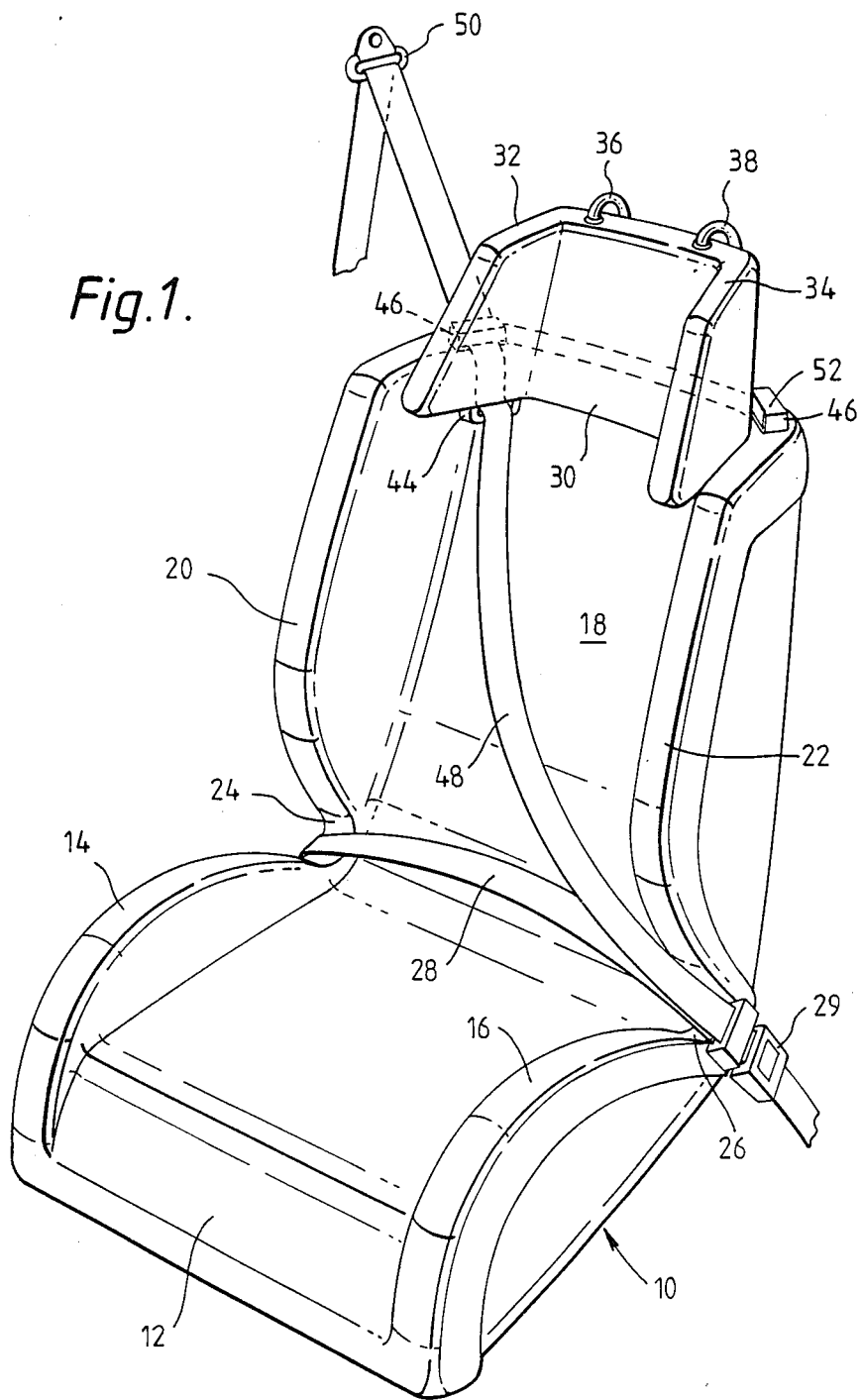
FIG. 1 is a perspective view of a child's safety seat in accordance with a first embodiment of the invention, secured by an adult seat belt on the righthand side of a motor car.

Referring to FIG. 1, a child's safety seat comprises a seat body 10 having a seat portion 12 with side walls 14 and 16 forming arm rests, and a back rest 18 with side walls 20 and 22. Notches 24 and 26, formed between the side walls 14, 20, and 16, 22 respectively form first and second guide means for the lap portion 28 of an adult seat belt which is secured by a buckle 29.

Figure 2:
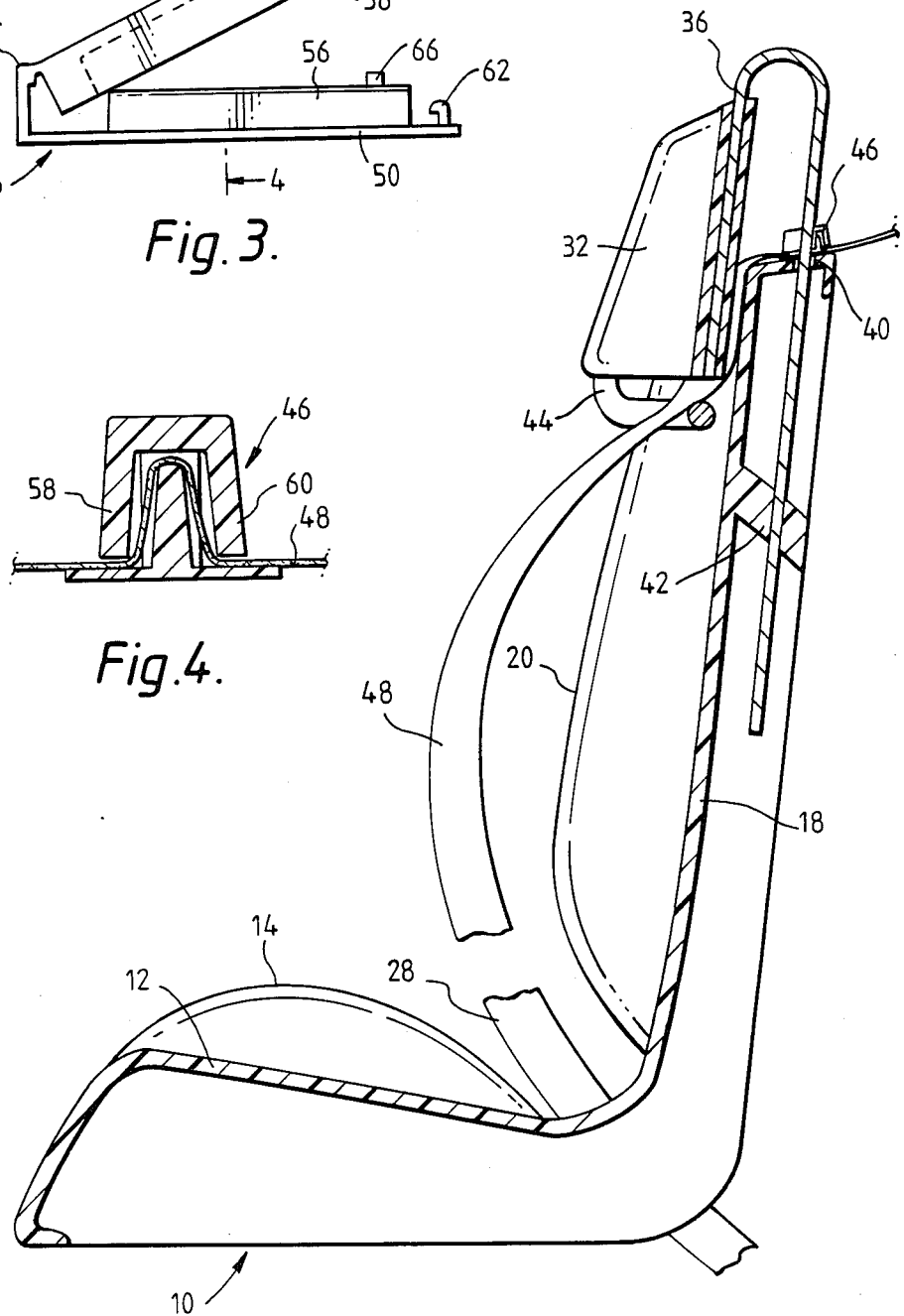
FIG. 2 is a schematic transverse cross-sectional view of seat shown in FIG. 1.

A head rest 30, having side wings 32 and 34 is mounted on a pair of inverted U-shaped slide bars 36 and 38, one end of each slide bar 36, 38 being embedded in the head rest 30. The other end of each slide bar 36, 38 projects through a respective opening 40 in the top edge of the back rest 18 and downwardly into frictional engagement with a respective bush 42 secured to the back of the back rest 18 (only the bush 42 for the slide bar 36 being visible in FIG. 2). The vertical position of the head rest 30 relative to the back rest 18 can be adjusted by sliding the slide bars 36 and 38 through their respective bushes 42, the bottom of the head rest 30 being in front of the back rest 18 and the side walls 32 and 34 thereof between the side walls 20 and 22 of the back rest 18.

The side wall 32 of the head rest 30 has a rearwardly and/or inwardly facing belt guide hook 44 projecting from its lower edge. A belt guide clamp 46 is mounted on the upper edge of the adjacent back rest side wall 20.

The shoulder portion 48 of the adult seat belt, which extends from the buckle 30 to a shoulder anchorage 50, passes through the guide hook 44 and the guide clamp 46 as illustrated. In order to permit the seat 10 to be used on the left-hand side of the car, a second guide hook (not shown) is mounted on the bottom edge of the opposite side wall 34 of the head rest 30 and a second guide clamp 52 is mounted on the top of the adjacent back rest side wall 22 (FIG. 1).

Figure 3:
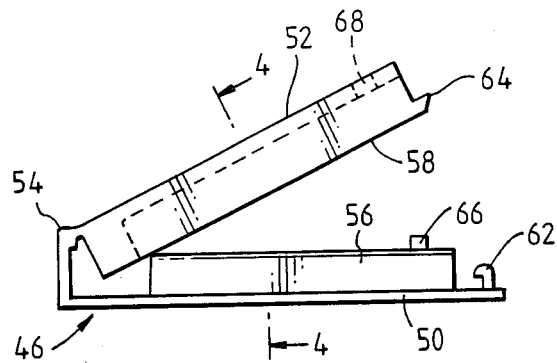
FIG. 3 is a side view of the third guide means of the seat shown in FIGS. 1 and 2 in the released position.
Figure 4:
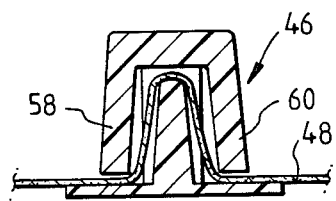
FIG. 4 is a cross-sectional view taken on the line 4—4 in FIG. 3 but showing the guide means in the secured position.

FIGS. 3 and 4 illustrate the belt clamp 46 in more detail. The clamp 46 is formed as a one-piece plastics moulding, consisting of a base portion 50 connected at one end to a lever portion 52 by an integral hinge 54. The base portion 50 has a longitudinally extending central rib 56 while the lever portion 52 has two mutually parallel ribs 58 and 60 which are positioned one on each side of the rib 56. At the opposite end to the hinge 54, the base portion has a resilient catch 62 which can be brought into engagement with a projection 64 on the corresponding end of the lever portion 52.

When the lever portion 52 is positioned parallel to the base portion 50, with the catch 62 engaged, the three ribs 56, 58 and 60 define a sinuous path for the belt 48 of sufficiently high friction to resist retraction of the seat belt by its emergency locking retractor (not shown) below the shoulder anchorage 50. A stud 66 on the end of the rib 56 nearer to the catch 62 engages in a recess 68 in the lever portion 52 so as to prevent the belt 48 from slipping out sideways. Provided that the headrest 30 is correctly positioned for a particular seat occupant, the shoulder belt 48 will be correctly positioned across the occupant's torso.

FIGS. 5 to 8 illustrate a second embodiment of the invention comprising a seat body 70, similar to the seat body 10 of FIG. 1, formed as a one-piece plastics moulding and having a seat portion 72 with side walls 74 and 76 forming arm rests, and a back rest 78 with side walls 80 and 82. Notches 84 and 86, formed between the side walls 74, 80, and 76, 82 respectively form first and second guide means for the lap portion 28 of the adult seat belt. The shoulder portion 48 of the adult seat belt is not shown in FIGS. 6 and 8.

A head rest 90, formed as a one-piece plastics moulding and having side wings 92 and 94 is mounted on a pair of slide tracks 96 and 98 which are recessed into the back rest 78 adjacent to its junctions with the side wings 80 and 82 respectively. As can be seen from FIGS. 6 and 7, the track 96 consists of a channel-like metal pressing having side flanges 100 and 102 which abut against walls of a recess 104 in the back of the back rest 78, and upper and lower end tabs 106 and 108 which are secured to the back rest 78 by rivets 110 and 112 respectively.

Between the flanges 100 and 102, the track 96 is generally U-shaped, and has a central vertically extending slot 114 which is engaged by a slide-shoe formed from interlocking rear and front parts 116 and 118. The rear slide shoe part 116 is of generally T-shaped cross-section, having its cross-bar located on the rear side of the track 96 and its stem projecting through the slot 114 into a recess in the front slide shoe part 118 on which the head rest 90 is mounted, the two slide shoe parts 116 and 118 and the head rest 90 being held together by a bolt 120.

The lower part 122 of the side wing 92 of the head rest 90, which abuts against the front slide shoe part 118, is inclined to the upper part, as can be seen in FIG. 7. The lower part 122 contains a slot 124, which is somewhat wider than the adult safety belt and which has a branch slot 126 permitting the shoulder part 48 of the adult safety belt to be inserted therein. The front slide shoe part 118 contains a slot 128 which is aligned with the slot 124 and has its bottom side aligned with the bottom of the slot 124, but is broader in the vertical direction. In its upper edge, the slot 128 contains a groove 130 which accommodates a locking cam bar 132. The cam bar 132 is dimensioned to allow space for the shoulder part 48 of the adult seat belt to pass between it and the bottom of the slot 128 and its upper edge is convex so that it can rock against the top of the groove 130. The bottom edge of the cam bar 132 is angled so that the cam bar rocks rearwardly in the event that tension is applied to the upper end of the shoulder part 48 of the adult belt, allowing the latter to move freely through the slots 124 and 128, but rocks into a wedging position if any attempt is made to pull the adult belt through the grooves 124 and 128 in the opposite direction.

The side wall 94 and the track 98 on the other side of the head rest 90, together with the associated slide shoe parts, are a mirror image of the side wall 92, the slide guide 96 and the slide shoe parts 116 and 118. Where visible, they are denoted by the same reference numerals.

In use, the seat is located on an adult vehicle seat with the head rest 90 either at the required height for the child who is to occupy the seat or at a higher position. The child is then placed on the seat, the adult seat belt secured by the buckle 29 and the shoulder portion 48 thereof inserted into one of the slots 124. The height of the head rest 90 is then adjusted, if necessary. Finally, any slack in the adult seat belt is pulled through the slots 124 and 128 so that the child seat is securely held in position by the lap portion 28 of the adult seat belt. The cam bar 32 prevents any slack being fed back through the slots 124 and 128 which could otherwise cause the lap portion 28 to slacken. The head rest 90 is retained in its set position on the tracks 96 by friction.

Figure 5:
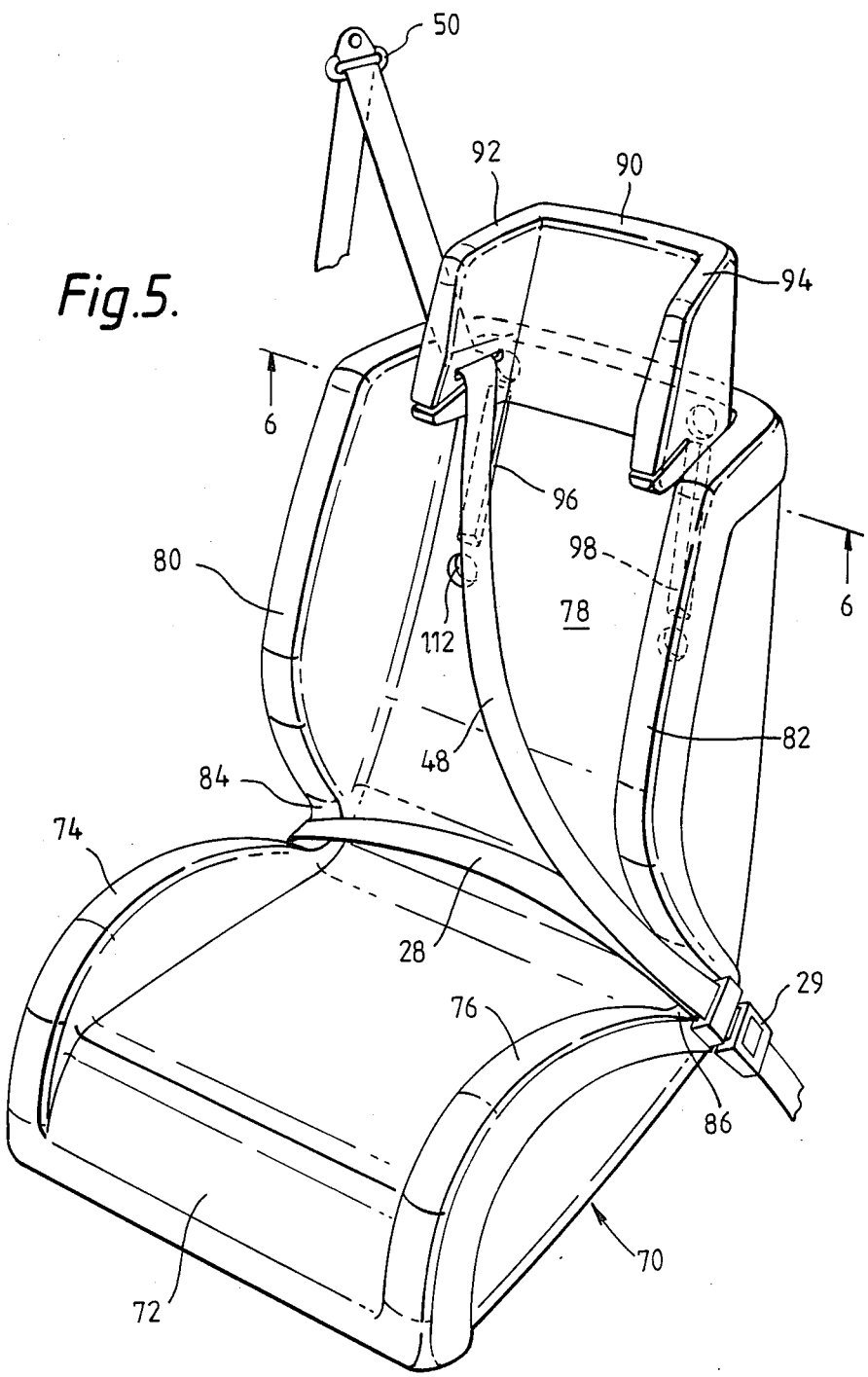
FIG. 5 is a perspective view, similar to FIG. 1, of a second embodiment of the invention, with the head rest in its highest position.
Figure 6:
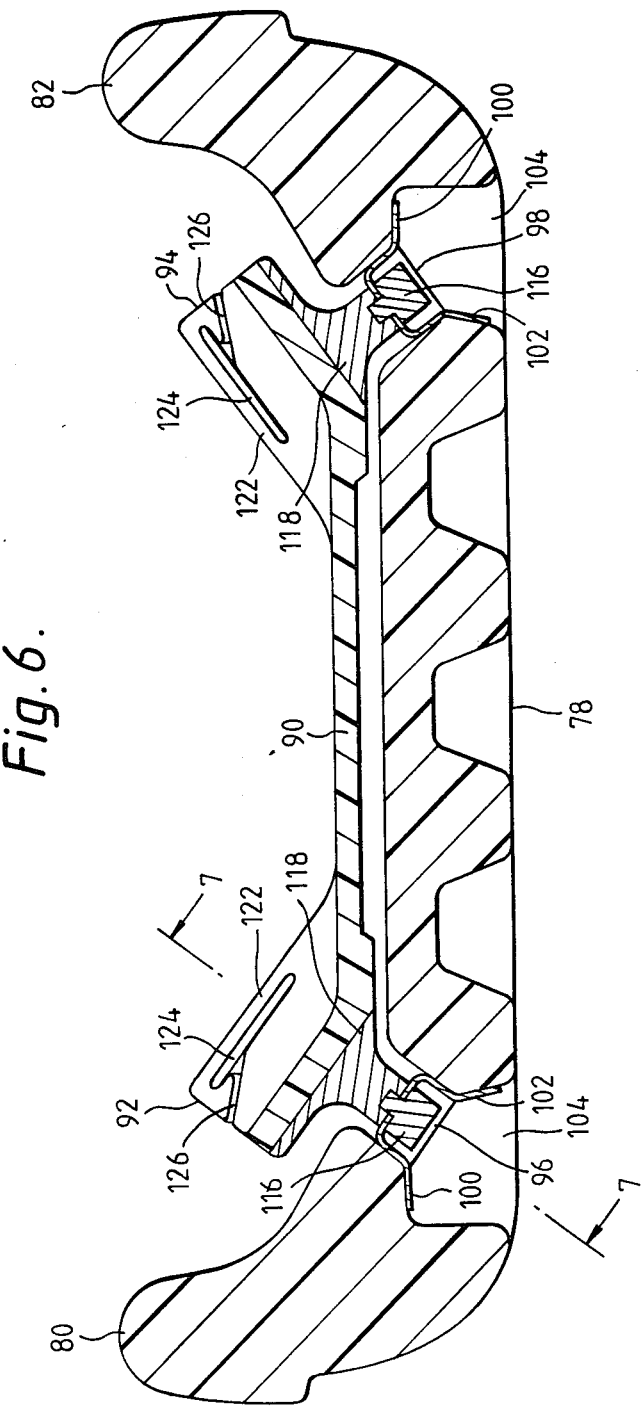
FIG. 6 is a cross-sectional view taken on the line 6—6 in FIG. 5 but showing the guide means in the secured position.

The belt clamp of FIGS. 3 and 4 may be used with the seat shown in FIG. 5. Similarly, the clamp incorporating the cam bar 132 of FIG. 7 may be used with the seat shown in FIG. 1.

We claim:

1. A child's safety seat comprising a seat body having a seat portion, a back rest, vertically extending side walls projecting forwardly from the side edges of the back rest, first and second guide means adjacent to the junction between the seat portion and the back rest for locating a lap portion of an adult seat belt, a head rest mounted on the back rest, means for mounting the head rest on the back rest so as to permit adjustment of the distance between the head rest and the seat portion, and third guide means for guiding the shoulder portion of an adult belt between the back rest and the head rest.

2. A child's safety seat according to claim 1, wherein the third guide means includes means for restricting movement of the shoulder portion of said adult seat belt relative to the guide means in the transverse direction of the belt.

3. A child's safety seat according to claim 2, wherein the third guide means includes blocking means for restricting movement of the shoulder portion of said adult seat belt relative to the guide means in the longitudinal direction of the belt.

4. A child's safety seat according to claim 3, wherein the blocking means comprises a wedging cam arranged to inhibit movement of the shoulder portion of said adult seat belt through the guide means in one direction while allowing movement in the opposite direction.

5. A child's safety seat according to claim 3, wherein the third guide means comprises first and second pivotally interconnected base portions, a pair of spaced parallel formations on the second base portion and a complementary formation on the first base portion arranged so as to lie between the parallel formations so as to define a sinuous path therebetween when the first and second base portions are in a first relative angular position and to be clear of the parallel formations when the first and second base portions are in a second angular position, together with catch means for securing the first and second base portions in their first relative angular position.

6. A child's safety seat according to claim 1, wherein the headrest has a pair of side walls and the third guide means is mounted on one of the side walls.

7. A child's safety seat according to any of claim 6, wherein fourth guide means similar to the third guide means, is mounted on the other side wall of the head rest.

8. A child's safety seat according to any of claim 1, wherein the head rest is mounted on the seat body by two U-shaped slide bars, one limb of each slide bar being embedded in the head rest and the other limb engaging in guide means in the back rest.

9. A child's safety seat according to any of claim 1, wherein the head rest has by two slide shoes each of which engages in a respective guide track which is recessed into the back rest.

* * * * *